Feb. 18, 1969   H. E. ROSENBERGER   3,428,390
METALLURGICAL OPTICAL SEMI-OBJECTIVE OF UNITY MAGNIFICATION
Filed April 13, 1966
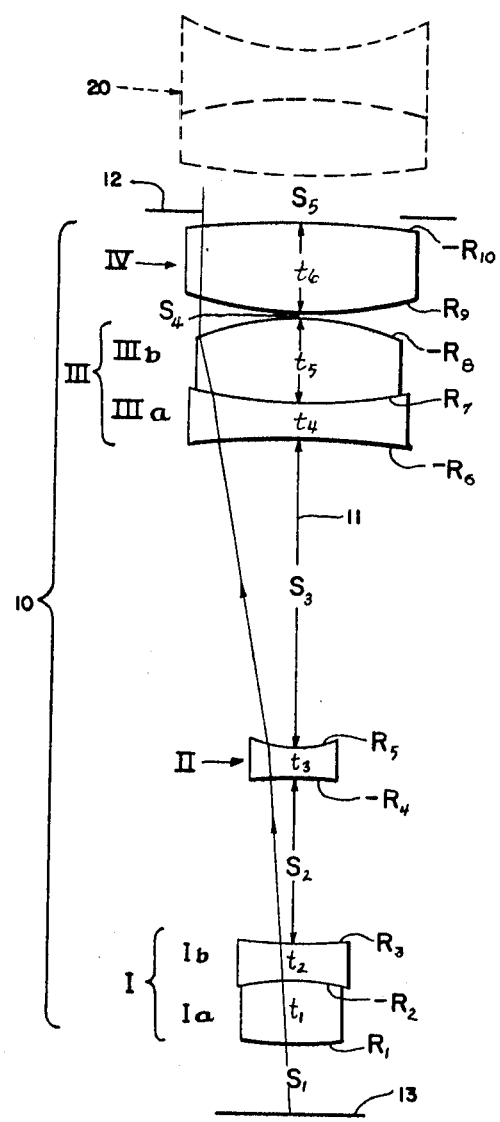
HAROLD E. ROSENBERGER
INVENTOR.
BY *Frank C. Parker*
ATTORNEY

United States Patent Office 3,428,390
Patented Feb. 18, 1969

3,428,390
METALLURGICAL OPTICAL SEMI-OBJECTIVE OF UNITY MAGNIFICATION
Harold E. Rosenberger, Brighton, N.Y., assignor to Bausch & Lomb Incorporated, Rochester, N.Y., a corporation of New York
Filed Apr. 13, 1966, Ser. No. 542,413
U.S. Cl. 350—177
Int. Cl. G02b 1/00
8 Claims The present invention relates to an optical objective for use in examining specular surfaces which are vertically illuminated and more particularly it relates to improvements in objectives for metallographs.

Optical objectives of the kind generally described hereinbelow have been disclosed in a copending application of Harold E. Rosenberger, Ser. No. 408,875, filed Nov. 4, 1964, now abandoned in favor of continuation application Ser. No. 732,485, filed May 2, 1968 and having the same assignee, wherein is described in particular a superior microscope objective for use with biological specimens which are usually diascopically illuminated by transmitted light. It has been discovered that when such an objective is used in metallurgical microscopes where the specimen is reflective and opaque, specular light reflected from the specimen is degraded by the simultaneous ghost reflections caused by the vertical illuminator at the air-glass lens surfaces in the objective. Furthermore, anti-reflection coating when applied to said air-glass lens surfaces may reduce but does not eliminate the above-described difficulty.

In view of the foregoing statements, it is an object of the present invention to provide a microscope semi-objective of the kind described in the above-mentioned patent application having together with a 5× corrector lens substantially 5.0× overall magnification wherein ghost reflections from air-glass lens surfaces therein are either eliminated or are reduced to an innocuous condition.

It is a further object to provide such an objective having a very flat field and low distortion along with a superior degree of correction for astigmatism, coma and spherical image aberrations.

Further objects and advantages will be found in the arrangement and detailed structure of the parts of said objective by reference to the following specification and the accompanying drawing, wherein the single figure is an optical diagram showing a preferred form of said invention.

The present microscope semi-objective per se is rated at 1.0× magnification and is designated in the drawing generally by the numeral 10. It is a member of a group of related metallographic semi-objectives having different magnification ratings which are interchangeably used in common with a single negative form corrector lens of 5× magnification as described in the aforementioned application of Rosenberger. Said corrector lens is designated by numeral 20 in the drawing and its magnification rating of 5×, when combined with the 1.0× magnification of the present semi-objective, produces a total magnification of 5.0× for the entire objective, and corrects certain aberrations in the imaging properties of said semi-objective in the same manner as recited in the cited Rosenberger application. Corrector lens 20 is located on the optical axis 11 of the semi-objective 10 at a fixed distance $S_5$ rearwardly from the semi-objective.

According to the present invention the lens members I to IV are so formed and arranged that the deleterious aforesaid ghost reflections are avoided but nevertheless a very excellent state of correction of the monochromatic image aberrations is provided, particularly as regards field curvature, astigmatism and coma. Comprised in the semi-objective 10 is a front lens member of doublet form which is designated I and it is located rearwardly of an object plane 13 at an axial distance designated $S_1$ along the optical axis 11. The front doublet I is comprised of a front double convex lens element Ia which lies in complete contact with a rear double concave lens element designated Ib, the axial thickness of the front and rear elements being designated $t_1$ and $t_2$ respectively.

Spaced rearwardly of lens member I at an axial distance designated $S_2$ is a singlet lens member designated II, said member being of double concave form and having an axial thickness designated $t_3$.

Spaced at an axial distance designated $S_3$ to the rear of lens member II is a second doublet lens member designated III which is comprised of a front double concave lens element IIIa and a rear double convex lens element IIIb in complete contact therewith along a common interface, the respective axial thicknesses thereof being designated $t_4$ and $t_5$.

In rearmost position is provided a singlet double convex lens member designated IV which is spaced at an axial distance designated $S_4$ from member III, the axial thickness thereof being designated $t_6$.

Between the semi-objective 10 and the corrector lens 20 is positioned an aperture diaphragm 12 for the control of the numerical aperture. The complete objective is characterized by a small numerical aperture of 0.1 and a large field and said numerical aperture is controlled by positioning said aperture diaphragm 12 close to the rear surface of lens member IV where the large field will not be restricted by said diaphragm which has a diameter of between .23F and .24F where F represents the combined equivalent focal length of said semi-objective and said corrector lens together.

The lens parameters for the semi-objective 10 per se are given in Table I of mathematical statements herebelow wherein values are given for the equivalent focal lengths which are designated $F_I$ to $F_{IV}$ for the successive lens members I to IV and for the lens elements Ia to IIIb which are designated respectively $F_{Ia}$ to $F_{IIIb}$, the minus (—) sign used with certain focal lengths meaning negative focal lengths. In Table I values are given for constructional data such as the radii of curvature of the successive lens surfaces designated $R_1$ to $-R_{10}$ of the lens members I to IV, the minus (—) sign used in connection with the R values meaning that the center of curvature of such radii lies on the object side thereof. Furthermore, in Table I are given values for the aforesaid lens thicknesses $t_1$ to $t_6$ and air spaces $S_1$ to $S_5$ along with the absolute values of the refractive indices $n_D(I)$ to $n_D(IV)$ and Abbe numbers $\nu(I)$ to $\nu(IV)$ of the successive lens members and lens elements.

TABLE I $.38F < F_I < .51F$
$.27F < -F_{II} < .30F$
$1.01F < F_{III} < 1.03F$
$.70F < F_{IV} < .82F$
$.17F < F_{Ia} < .22F$
$.29F < -F_{Ib} < .34F$
$.49F < -F_{IIIa} < .55F$
$.36F < F_{IIIb} < .40F$
$.40F < R_1 < .53F$
$.18F < -R_2 < .22F$
$.87F < R_3 < .99F$
$2.20F < -R_4 < 8.15F$
$.15F < R_5 < .17F$
$1.70F < -R_6 < 1.90F$
$.46F < R_7 < .54F$
$.27F < -R_8 < .31F$
$.42F < R_9 < .50F$
$1.83F < -R_{10} < 3.05F$

TABLE I—Continued $.07F < t_1 < .08F$
$.04F < t_2 < .05F$
$.02F < t_3 < .04F$
$.04F < t_4 < .05F$
$.09F < t_5 < .11F$
$.09F < t_6 < .14F$
$.07F < S_1 < .09F$
$.17F < S_2 < .20F$
$.33F < S_3 < .38F$
$.0002F < S_4 < .10F$
$.05F < S_5 < .10F$
$1.749 < n_D(Ia) < 1.753$
$1.513 < n_D(Ib) < 1.515$
$1.513 < n_D(II) < 1.515$
$1.749 < n_D(IIIa) < 1.753$
$1.513 < n_D(IIIb) < 1.515$
$1.513 < n_D(IV) < 1.515$
$27.6 < \nu(Ia) < 28.0$
$69.5 < \nu(Ib) < 70.5$
$69.5 < \nu(II) < 70.5$
$27.6 < \nu(IIIa) < 28.0$
$69.5 < \nu(IIIb) < 70.5$
$69.5 < \nu(IV) < 70.5$ More specifically, the values for the lens parameters and/or constructional data describing one successful form of the semi-objective 10 are given substantially in Table II herebelow wherein the symbolism remains the same as used in Table I.

TABLE II

| | |
|---|---|
| $F_I = .434F$ | $-R_8 = .293F$ |
| $-F_{II} = .287F$ | $R_9 = .456F$ |
| $F_{III} = 1.012F$ | $-R_{10} = 2.310F$ |
| $F_{IV} = .754F$ | $S_1 = .081F$ |
| $F_{Ia} = .189F$ | $S_2 = .190F$ |
| $-F_{Ib} = .303F$ | $S_3 = .354F$ |
| $-F_{IIIa} = .518F$ | $S_4 = .0068F$ |
| $F_{IIIb} = .376F$ | $S_5 = .058F$ |
| $t_1 = .075F$ | $n_D(Ia) = 1.751$ |
| $t_2 = .043F$ | $n_D(Ib) = 1.514$ |
| $t_3 = .038F$ | $n_D(II) = 1.514$ |
| $t_4 = .040F$ | $n_D(IIIa) = 1.751$ |
| $t_5 = .101F$ | $n_D(IIIb) = 1.514$ |
| $t_6 = .103F$ | $n_D(IV) = 1.514$ |
| $R_1 = .458F$ | $\nu(Ia) = 27.8$ |
| $-R_2 = .191F$ | $\nu(Ib) = 70.0$ |
| $R_3 = .904F$ | $\nu(II) = 70.0$ |
| $-R_4 = 2.223F$ | $\nu(IIIa) = 27.8$ |
| $R_5 = .159F$ | $\nu(IIIb) = 70.0$ |
| $-R_6 = 1.878F$ | $\nu(IV) = 70.0$ |
| $R_7 = .500F$ | |

A second form of the semi-objective 10 is disclosed in more specific terms in Table III herebelow where the symbolism remains the same as heretofore, the optical performance thereof being about equal to the form shown in Table II.

TABLE III

| | |
|---|---|
| $F_I = .508F$ | $t_4 = .0452F$ |
| $-F_{II} = -.277F$ | $t_5 = .1047F$ |
| $F_{III} = 1.022F$ | $t_6 = .0925F$ |
| $F_{IV} = .814F$ | $S_1 = .0808F$ |
| $F_{Ia} = .214F$ | $S_2 = .1975F$ |
| $-F_{Ib} = -.331F$ | $S_3 = .3725F$ |
| $-F_{IIIa} = -.537F$ | $S_4 = .000238F$ |
| $F_{IIIb} = .386F$ | $S_5 = .0875F$ |
| $R_1 = .523F$ | $n_D(Ia) = 1.751$ |
| $-R_2 = -.214F$ | $n_D(Ib) = 1.514$ |
| $R_3 = .882F$ | $n_D(II) = 1.514$ |
| $-R_4 = -2.395F$ | $n_D(IIIa) = 1.751$ |
| $R_5 = .1667F$ | $n_D(IIIb) = 1.514$ |
| $-R_6 = -1.849F$ | $n_D(IV) = 1.514$ |
| $R_7 = .522F$ | $\nu(Ia) = 27.8$ |
| $-R_8 = -.299F$ | $\nu(Ib) = 70.0$ |
| $R_9 = .482F$ | $\nu(II) = 70.0$ |

TABLE III—Continued

| | |
|---|---|
| $-R_{10} = -3.028F$ | $\nu(IIIa) = 27.8$ |
| $t_1 = .078F$ | $\nu(IIIb) = 70.0$ |
| $t_2 = .0437F$ | $\nu(IV) = 70.0$ |
| $t_3 = .0389F$ | |

A third form of the semi-objective 10 is disclosed in specific terms in Table IV herebelow where the symbolism remains the same as heretofore, the optical performance thereof being very similar to the objective specified in Table III.

TABLE IV

| | |
|---|---|
| $F_I = .390F$ | $t_4 = .0407F$ |
| $-F_{II} = -.293F$ | $t_5 = .0968F$ |
| $F_{III} = 1.013F$ | $t_6 = .133F$ |
| $F_{IV} = .702F$ | $S_1 = .077F$ |
| $F_{Ia} = .1787F$ | $S_2 = .182F$ |
| $-F_{Ib} = -.297F$ | $S_3 = .341F$ |
| $-F_{IIIa} = -.496F$ | $S_4 = .093F$ |
| $F_{IIIb} = .365F$ | $S_5 = .093F$ |
| $R_1 = .413F$ | $n_D(Ia) = 1.751$ |
| $-R_2 = -.183F$ | $n_D(Ib) = 1.514$ |
| $R_3 = .976F$ | $n_D(II) = 1.514$ |
| $-R_4 = -8.080F$ | $n_D(IIIa) = 1.751$ |
| $R_5 = .1554F$ | $n_D(IIIb) = 1.514$ |
| $-R_6 = -1.718F$ | $n_D(IV) = 1.514$ |
| $R_7 = .478F$ | $\nu(Ia) = 27.8$ |
| $-R_8 = -.2835F$ | $\nu(Ib) = 70.0$ |
| $R_9 = .438F$ | $\nu(II) = 70.0$ |
| $-R_{10} = -1.843F$ | $\nu(IIIa) = 27.8$ |
| $t_1 = .0728F$ | $\nu(IIIb) = 70.0$ |
| $t_2 = .0428F$ | $\nu(IV) = 70.0$ |
| $t_3 = .0379F$ | |

From the foregoing description of the semi-objective 10 it will be apparent that the present invention provides a suitable objective for examining metallurgical specimens and other specular objects without the degrading effect of ghost reflections in the field of view and furthermore the objective is completely corrected to guarantee a high-grade optical performance.

Although only certain forms of the invention have been shown and described in detail, other forms are possible and changes may be made in the lens parameters and constructional data within the limits specified herein without departing from the spirit of the invention.

I claim:

1. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thickness thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the values for the lens parameters of said semi-objective being given in Table I of mathematical statements herebelow wherein $F_I$ to $F_{IV}$ represent the equivalent focal lengths of lens members I to IV respectively, the minus (—) sign used with certain focal designations meaning negative focal lengths, the table further including the values for the aforesaid thicknesses $t_1$ to $t_6$ and spaces $S_1$ to $S_5$, all of said values being given in terms of F which is the equivalent focal length of said semi-objective combined with the aforesaid corrector lens,

TABLE I $.38F < F_I < .51F$
$.27F < -F_{II} < .30F$
$1.01F < F_{III} < 1.03F$
$.70F < F_{VI} < .82F$
$.07F < t_1 < .08F$
$.04F < t_2 < .05F$
$.02F < t_3 < .04F$
$.04F < t_4 < .05F$
$.09F < t_5 < .11F$
$.09F < t_6 < .14F$
$.07F < S_1 < .09F$
$.17F < S_2 < .20F$
$.33F < S_3 < .38F$
$.0002F < S_4 < .10F$
$.05F < S_5 < .10F$

2. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the values for the lens parameters of said semi-objective being given in Table I of mathematical statements herebelow wherein $F_I$ to $F_{IV}$ represent the equivalent focal lengths of lens members I to IV respectively, the minus (—) sign used with certain focal designations meaning negative focal lengths, the table further including the values for the aforesaid thicknesses $t_1$ to $t_6$ and spaces $S_1$ to $S_5$, all of said values being given in terms of F which is the equivalent focal length of said semi-objective combined with the aforesaid corrector lens,

TABLE I $.38F < F_I < .51F$
$.27F < -F_{II} < .30F$
$1.01F < F_{III} < 1.03F$
$.70F < F_{IV} < .82F$
$.07F < t_1 < .08F$
$.04F < t_2 < .05F$
$.02F < t_3 < .04F$
$.04F < t_4 < .05F$
$.09F < t_5 < .11F$
$.09F < t_6 < .14F$
$.07F < S_1 < .09F$
$.17F < S_2 < .20F$
$.33F < S_3 < .38F$
$.0002F < S_4 < .10F$
$.05F < S_5 < .10F$ the absolute values for the refractive indices designated $n_D(Ia)$ to $n_D(IV)$ and Abbe numbers $\nu(Ia)$ to $\nu(IV)$ of the glasses in the lens elements Ia to IV respectively bein given in Table II herebelow,

TABLE II $1.749 < n_D(Ia) < 1.753$
$1.513 < n_D(Ib) < 1.515$
$1.513 < n_D(II) < 1.515$
$1.749 < n_D(IIIa) < 1.753$
$1.513 < n_D(IIIb) < 1.515$
$1.513 < n_D(IV) < 1.515$
$27.6 < \nu(Ia) < 28.0$
$69.5 < \nu(Ib) < 70.5$
$69.5 < \nu(II) < 70.5$
$27.6 < \nu(IIIa) < 28.0$
$69.5 < \nu(IIIb) < 70.5$
$69.5 < \nu(IV) < 70.5$

3. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the values for the lens parameters of said semi-objective being given in Table I of mathematical statements hereinbelow wherein $F_I$ to $F_{IV}$ represent the equivalent focal lengths of lens members I to IV respectively, the equivalent focal lengths of the lens elements Ia, Ib, IIIa and IIIb being designated $F_{Ia}$, $-F_{Ib}$, $-F_{IIIa}$ and $F_{IIIb}$ respectively, the minus (—) sign used with certain focal designations meaning negative focal lengths, the table further including the values for the aforesaid thicknesses $t_1$ to $t_6$ and spaces $S_1$ to $S_5$, all of said values being given in terms of F which is the equivalent focal length of said semi-objective combined with the aforesaid corrector lens,

TABLE I $.38F < F_I < .51F$
$.27F < -F_{II} < .30F$
$1.01F < F_{III} < 1.03F$
$.70F < F_{IV} < .82F$
$.17F < F_{Ia} < .22F$
$.29F < -F_{Ib} < .34F$
$.49F < -F_{IIb} < .55F$
$.36F < F_{IIIb} < .40F$
$.07F < t_1 < .08F$
$.04F < t_2 < .05F$
$.02F < t_3 < .04F$
$.04F < t_4 < .05F$
$.09F < t_5 < .11F$
$.09F < t_6 < .14F$
$.07F < S_1 < .09F$
$.17F < S_2 < .20F$
$.33F < S_3 < .38F$
$.0002F < S_4 < .10F$
$.05F < S_5 < .10F$

4. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism, as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$.

and a rearmost double convex singlet lens element designated IV which is spaced at an axial distance denoted $S_4$ from member III and has an axial thickness denoted $t_6$, the values for the lens parameters of said semi-objective being given in the table of mathematical statements herebelow wherein $R_1$ to $-R_{10}$ designate the radii of the successive lens surfaces wherein the minus (—) sign used with certain designations signifies that the centers of curvature of the surfaces so identified lay on the object side thereof, in addition to the thicknesses $t_1$ to $t_6$, and air spaces $S_1$ to $S_5$, all of said values being given in terms of F which is the equivalent focal length of said semi-objective combined with the aforesaid corrector lens, $.4vF < R_1 < .53F$
$.18F < -R_2 < .22F$
$.87F < R_3 < .99F$
$2.20F < -R_4 < 8.15F$
$.15F < R_5 < .17F$
$1.70F < -R_6 < 1.90F$
$.46F < R_7 < .54F$
$.27F < -R_8 < .31F$
$.42F < R_9 < .50F$
$1.83F < -R_{10} < 3.05F$
$.07F < t_1 < .08F$
$.04F < t_2 < .05F$
$.02F < t_3 < .04F$
$.04F < t_4 < .05F$
$.09F < t_5 < .11F$
$.09F < t_6 < .14F$
$.07F < S_1 < .09F$
$.17F < S_2 < .20F$
$.33F < S_3 < .38F$
$.0002F < S_4 < .10F$
$.05F < S_5 < .10F$ 5. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the values for the lens parameters of said semi-objective being given in the table of mathematical statements herebelow wherein $R_1$ to $-R_{10}$ designate the radii of the successive lens surfaces wherein the minus (—) sign used with certain designations signifies that the centers of curvature of the surface so identified lay on the object side thereof, in addition to the thicknesses $t_1$ to $t_6$, and air spaces $S_1$ to $S_5$, all of said values being given in terms of F which is the equivalent focal length of said semi-objective combined with the aforesaid corrector lens, $.40F < R_1 < .53F$
$.18F < -R_2 < .22F$
$.87F < R_3 < .99F$
$2.20F < -R_4 < 8.15F$
$.15F < R_5 < .17F$
$1.70F < -R_6 < 1.90F$
$.46F < R_7 < .54F$
$.27F < -R_8 < .31F$
$.42F < R_9 < .50F$ $$1.83F < -R_{10} < 3.05F$$
$$.07F < t_1 < .08F$$
$$.04F < t_2 < .05F$$
$$.02F < t_3 < .04F$$
$$.04F < t_4 < .05F$$
$$.09F < t_5 < .11F$$
$$.09F < t_6 < .14F$$
$$.07F < S_1 < .09F$$
$$.17F < S_2 < .20F$$
$$.33F < S_3 < .38F$$
$$.0002F < S_4 < .10F$$
$$.05F < S_5 < .10F$$

said semi-objective further being characterized by the refractive indices which are designated $n_D(Ia)$ to $n_D(IV)$ and Abbe numbers which are designated $\nu(Ia)$ to $\nu(IV)$ of the glasses in the successive lens members and elements having absolute values as given in the table of mathematical statements herebelow, $$1.749 < n_D(Ia) < 1.753$$
$$1.513 < n_D(Ib) < 1.515$$
$$1.513 < n_D(II) < 1.515$$
$$1.749 < n_D(IIIa) < 1.753$$
$$1.513 < n_D(IIIb) < 1.515$$
$$1.513 < n_D(IV) < 1.515$$
$$27.6 < \nu(Ia) < 28.0$$
$$69.5 < \nu(Ib) < 70.5$$
$$69.5 < \nu(II) < 70.5$$
$$27.6 < \nu(IIIa) < 28.0$$
$$69.5 < \nu(IIIb) < 70.5$$
$$69.5 < \nu(IV) < 70.5$$

6. A microscopic semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thickness thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the specific values for the lens parameters for one form of said semi-objective being given substantially in the table herebelow wherein $F_I$ to $F_{IV}$ represent the equivalent focal lengths of the aforesaid lens members and elements Ia to IIIb respectively, the minus (—) sign denoting negative focal lengths, the table further including the specific values substantially for the aforesaid lens thicknesses $t_1$ to $t_6$ and the successive air spaces $S_1$ to $S_5$, said values being stated in terms of F which represents the equivalent focal length of the semi-objective together with said corrector lens, the specific absolute values furthermore being given substantially for the refractive indices $n_D(Ia)$ to $n_D(IV)$ and the Abbe numbers $\nu(Ia)$ to $\nu(IV)$, $$F_I = .434F$$
$$-F_{II} = .287F$$
$$F_{III} = 1.012F$$
$$F_{IV} = .754F$$
$$F_{Ia} = .189F$$
$$-F_{Ib} = .303F$$
$$-F_{IIIa} = .518F$$
$$F_{IIIb} = .376F$$
$$t_1 = .075F$$
$$t_2 = .043F$$
$$t_3 = .038F$$
$$t_4 = .040F$$
$$t_5 = .101F$$
$$t_6 = .103F$$
$$S_1 = 0.81F$$
$$S_2 = .190F$$
$$S_3 = .354F$$
$$S_4 = .0068F$$
$$S_5 = .058F$$

$$\left.\begin{array}{l} n_D(Ia) = 1.751 \\ n_D(Ib) = 1.514 \\ n_D(II) = 1.514 \\ n_D(IIIa) = 1.751 \\ n_D(IIIb) = 1.514 \\ n_D(IV) = 1.514 \end{array}\right\} \text{absolute values}$$

$$\left.\begin{array}{l} \nu(Ia) = 27.8 \\ \nu(Ib) = 70.0 \\ \nu(II) = 70.0 \\ \nu(IIIa) = 27.8 \\ \nu(IIIb) = 70.0 \\ \nu(IV) = 70.0 \end{array}\right\} \text{absolute values}$$

7. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$, and a rearmost double convex singlet lens element designated IV which is spaced at an axial distance denoted $S_4$ from member III and has an axial thickness denoted $t_6$, the specific values for the lens parameters for one form of said semi-objective being given substantially in the table herebelow wherein $R_1$ to $-R_{10}$ represent the radii of the successive lens surfaces of the lens members I to IV, the minus (—) sign used with certain designations meaning that the center of curvature of such surfaces lies on the object side thereof, the table further including the specific values substantially for the aforesaid lens thicknesses $t_1$ to $t_6$ and air spaces $S_1$ to $S_5$, all of which are given in terms of F which represents the equivalent focal length of said semi-objective combined with said corrector lens, the specific absolute values furthermore being given for the refractive indices which are represented by $n_D(Ia)$ to $n_D(IV)$ as well as the Abbe numbers $\nu(Ia)$ to $\nu(IV)$ of the glasses used in the successive lens members and elements, $$R_1=.458F$$
$$-R_2=.191F$$
$$R_3=.904F$$
$$-R_4=2.223F$$
$$R_5=.159F$$
$$-R_6=1.878F$$
$$R_7=.500F$$
$$-R_8=.293F$$
$$R_9=.456F$$
$$-R_{10}=2.310F$$
$$t_1=.075F$$
$$t_2=.043F$$
$$t_3=.038F$$
$$t_4=.040F$$
$$t_5=.101F$$
$$t_6=.103F$$
$$S_1=.081F$$
$$S_2=.190F$$
$$S_3=.354F$$
$$S_4=.0068F$$
$$S_5=.058F$$

$$\left.\begin{array}{l} n_D(Ia)=1.751 \\ n_D(Ib)=1.514 \\ n_D(II)=1.514 \\ n_D(IIIa)=1.751 \\ n_D(IIIb)=1.514 \\ n_D(IV)=1.514 \\ \nu(Ia)=27.8 \\ \nu(Ib)=70.0 \\ \nu(II)=70.0 \\ \nu(IIIa)=27.8 \\ \nu(IIIb)=70.0 \\ \nu(IV)=70.0 \end{array}\right\} \text{absolute values}$$

8. A microscope semi-objective having a unity rated magnification and having together with an adjacent optically aligned corrector lens a rated magnification of 5.0× and a numerical aperture of substantially 0.1, the semi-objective and corrector lens together producing an image of excellent flatness which is well corrected for distortion and astigmatism as well as all other chromatic and monochromatic aberrations, and is free of ghost reflections when used with vertical illumination, said semi-objective comprising a front compound lens member designated I which is spaced rearwardly from an object surface at an axial distance designated $S_1$, said member I comprising a front double convex lens element and a rear double concave element which are in mutual contact along an interface and are designated Ia and Ib respectively, the axial thicknesses thereof being respectively $t_1$ and $t_2$, a singlet double concave lens member designated II optically aligned along with other lens members rearwardly of member I, the axial space between members I and II being designated $S_2$ and the axial thickness thereof $t_3$, a compound lens member designated III spaced at an axial distance $S_3$ rearwardly from member II, member III being comprised of a front double concave lens element designated IIIa which lies in mutual contact along an interface with a double convex lens element designated IIIb, the respective axial thicknesses thereof being designated $t_4$ and $t_5$.

and a rearmost double convex singlet lens element designated IV which is spaced at an axial distance denoted $S_4$ from member III and has an axial thickness denoted $t_6$, diaphragm means located close to the rear surface of lens member and in alignment therewith for controlling the numerical aperture of the complete objective including said corrector lens, said diaphragm having a diameter between .23F and .24F where F represents the combined equivalent focal length of said semi-objective and corrector lens, the values for the lens parameters of said semi-objective being given in Table I of mathematical statements herebelow wherein $F_I$ to $F_{IV}$ represent the equivalent focal lengths of lens members I to IV respectively, the minus (−) sign used with certain focal designations meaning negative focal lengths, the table further including the values for the aforesaid thicknesses $t_1$ to $t_6$ and spaces $S_1$ to $S_5$, all of said values being given in terms of F which is the equivalent focal length of said semi-objective combined with the aforesaid corrector lens, $$.38F<F_I<.51F$$
$$.27F<-F_{II}<.30F$$
$$1.01F<F_{III}<1.03F$$
$$.70F<F_{IV}<.82F$$
$$.07F<t_1<.08F$$
$$.04F<t_2<.05F$$
$$.02F<t_3<.04F$$
$$.04F<t_4<.05F$$
$$.09F<t_5<.11F$$
$$.09F<t_6<.14F$$
$$.07F<S_1<.09F$$
$$.17F<S_2<.20F$$
$$.33F<S_3<.38F$$
$$.0002F<S_4<.10F$$
$$.05F<S_5<.10F$$

References Cited

UNITED STATES PATENTS 3,115,538   12/1963   Ruben et al. _____ 350—216

JOHN K. CORBIN, *Primary Examiner.*

U.S. Cl. X.R.

350—206, 216, 220

UNITED STATES PATENT OFFICE
CERTIFICATE OF CORRECTION

Patent No. 3,428,390

February 18, 1969

Harold E. Rosenberger

It is certified that error appears in the above identified patent and that said Letters Patent are hereby corrected as shown below:

Column 8, line 1, ".4vF" should read -- .40F --.

Signed and sealed this 14th day of April 1970.

(SEAL)
Attest:

Edward M. Fletcher, Jr.
Attesting Officer

WILLIAM E. SCHUYLER, JR.
Commissioner of Patents